May 23, 1933.  C. A. HANSEN  1,910,013

MILK BOTTLE ATTACHMENT

Filed July 18, 1932

Inventor

Carl A. Hansen

By C A Snow & Co.

Attorneys

Patented May 23, 1933

1,910,013

UNITED STATES PATENT OFFICE

CARL A. HANSEN, OF LOS ANGELES, CALIFORNIA

MILK BOTTLE ATTACHMENT

Application filed July 18, 1932. Serial No. 623,273.

This invention relates to an attachment for use in connection with milk bottles, and aims to provide a novel form of clamp which may be clamped around the neck of a milk bottle, and constructed in such a way that milk tickets, notes or other articles pertaining to the retail sale of milk, may be clamped to the bottle.

An important object of the invention is to provide a clamp which may be readily and easily positioned around the neck of a milk bottle in such a way as to clamp an article to the bottle, without danger of the article becoming accidentally displaced.

A still further object of the invention is to provide a clamp having means to prevent movement of the clamp longitudinally of the neck of the bottle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
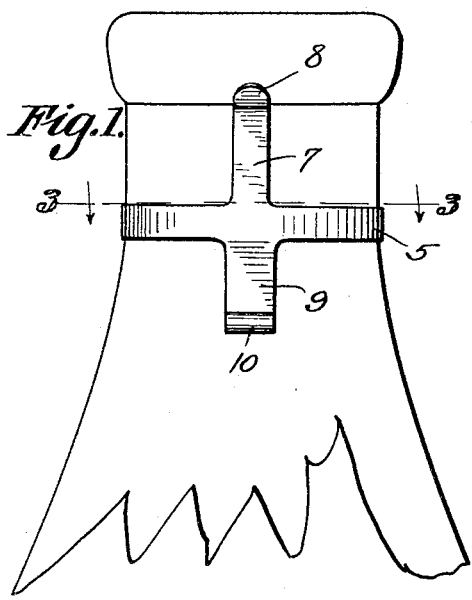
Figure 1 is a front elevational view of the clamp, illustrating the same as positioned on the neck of a milk bottle.
Figure 2:
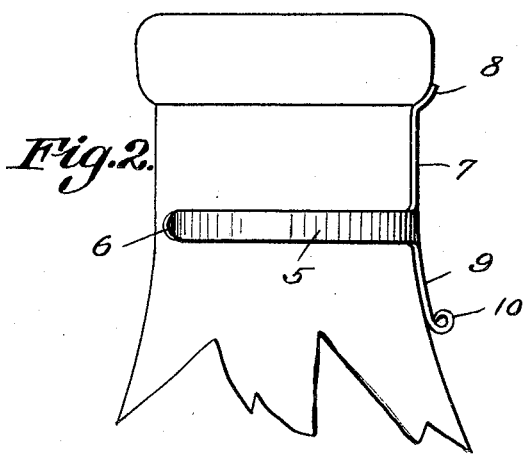
Figure 2 is a side elevational view of the clamp as positioned on a milk bottle.
Figure 3:
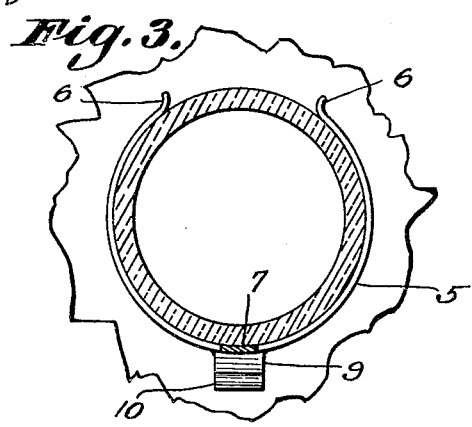
Figure 3 is a sectional view taken on line 3—3 of Figure 1.

Referring to the drawing in detail, the clamp comprises a body portion 5, which is in the form of a resilient split band, the band being of a diameter to closely grip the neck of a milk bottle, the ends of the split band being curved outwardly as at 6, to permit the body portion to be readily positioned.

Formed integral with the body portion, is an arm 7, that extends upwardly therefrom, the arm 7 being provided with an outwardly curved upper end portion 8 so curved that it conforms to the shape of the bead formed at the mouth of a milk bottle.

This arm 7 prevents upward movement of the body portion, holding the body portion securely in position while a ticket or other article is being placed under the arm 9.

The arm 9 extends downwardly from the body portion 5, at a point directly under the arm 7, the arm 9 being wider than the arm 7, to provide a wide clamping surface.

The free end of the arm 9 is curved upwardly at 10, providing a curved surface to permit a ticket, note or other article to be readily slid under the arm and gripped between the arm and milk bottle.

Figure 4:
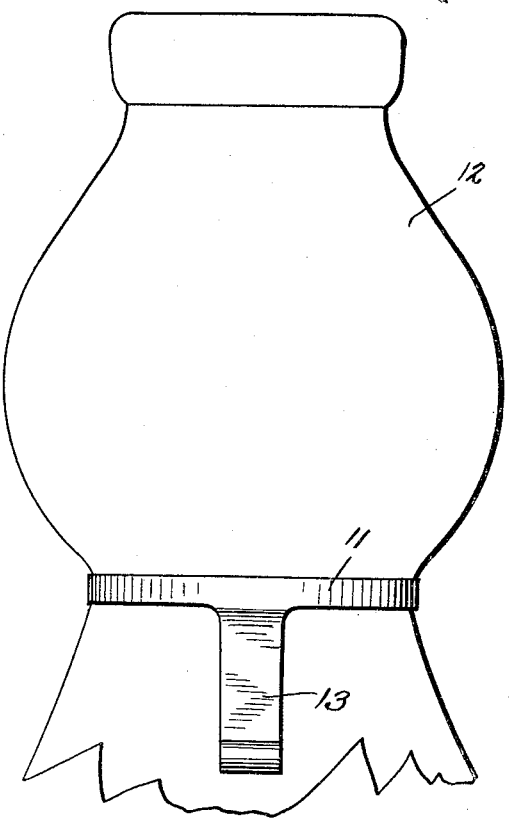
Figure 4 is an elevational view of a modified form of clamp.

In the form of the invention as shown by Figure 4 of the drawing, the body portion is indicated by the reference character 11 and is in the form of a split band which may be readily positioned in the recess formed within the neck of the bottle and providing an upper cream compartment 12.

Extending downwardly from the body portion 11 is an arm 13 which is formed of spring metal, to clamp a card or article between the arm and bottle neck.

Figure 5:
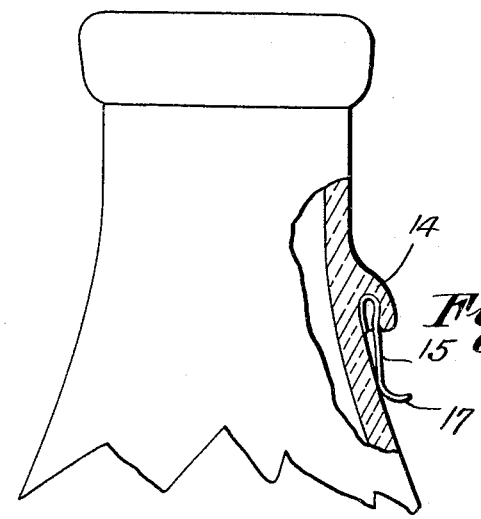
Figure 5 is a sectional view through a further modified form of the invention.

A further modified form of the invention is shown by Figure 5 of the drawing, in which form the neck of the bottle is constructed with an enlargement 14 that has a recess in the under surface thereof for the reception of the clamping arm 15. As clearly shown, the clamping arm 15 has its upper end bent downwardly to add resiliency to the arm, and cause the arm to be securely held within the recess.

The free end of the arm is curved outwardly as at 17 to permit a card or similar article to be readily positioned thereon.

From the foregoing it will be obvious that due to the construction shown and described, a clamp may be readily positioned around a milk bottle neck, to permit a card, ticket or similar article pertaining to the retail sale of milk, to be positioned thereon.

I claim:

A clamp of the class described comprising a body portion including a split band clamped around the bottle neck, an arm extending upwardly from the body portion and having a curved upper end fitted against the bead of a bottle neck to restrict movement of the body portion in one direction, and a depending clamping arm formed integral with the body portion and disposed directly under the first mentioned arm, to clamp an article against the neck of the bottle.

In testimony that I claim the foregoing as my own, I have hereto affixed my signature.

CARL A. HANSEN.